United States Patent [19]

Surie

[11] Patent Number: 4,675,886

[45] Date of Patent: Jun. 23, 1987

[54] FRAME SYNCHRONIZATION DEVICE

[75] Inventor: Serge Surie, L'Hay les Roses, France

[73] Assignee: Compagnie Industrielle des Telecommunications Cit-Alcatel, Paris, France

[21] Appl. No.: 767,017

[22] Filed: Aug. 19, 1985

[30] Foreign Application Priority Data

Aug. 17, 1984 [FR] France ............................. 84 12915
Dec. 14, 1984 [FR] France ............................. 84 19175

[51] Int. Cl.[4] ............................................. H04L 7/00
[52] U.S. Cl. ................................. 375/116; 307/269; 328/72
[58] Field of Search ............... 375/114, 116; 370/100, 370/105, 106; 371/42, 46; 307/269; 328/63, 72

[56] References Cited

U.S. PATENT DOCUMENTS

| | | | |
|---|---|---|---|
| 3,575,554 | 4/1971 | Schmidt | 375/116 |
| 3,576,947 | 5/1971 | Kruger | 375/116 |
| 3,760,355 | 9/1973 | Bruckert | 340/146.2 |
| 3,766,316 | 10/1973 | Hoffman et al. | 375/116 |
| 3,909,724 | 9/1975 | Spoth et al. | 375/116 |
| 4,214,124 | 7/1980 | Jarus | 375/114 |
| 4,242,755 | 12/1980 | Gauzan | 375/114 |
| 4,395,773 | 7/1983 | Philippides et al. | 307/269 |
| 4,468,770 | 8/1984 | Metcalf et al. | 371/42 |

Primary Examiner—Robert L. Griffin
Assistant Examiner—Stephen Chin
Attorney, Agent, or Firm—Sughrue, Mion, Zinn, Macpeak, and Seas

[57] ABSTRACT

Frame synchronization devices utilize a frame alignment word decoder connected to the outputs of a shift register which receives on its input the received data bit stream. It is clocked by a clock signal generated from a selection of periods of the data bit stream timing signal reproducing a periodic pattern. This pattern is formed by relative bit locations within the duration of a frame certain at least of which are distributed according to the distribution of the bits of an alignment word in a frame and which form groups of the same size regularly distributed over the duration of a frame. This clock signal is generated in the device by a divider which divides by 20 or by 21 which imposes on it a periodic phase skip by the value of one period of the data bit stream timing for as long as the alignment word is not recognized by the decoder. The shift register is implemented in two parallel parts clocked by versions of the clock signal with a relative phase shift between them, one of which parts updates the other part in parallel on each phase skip of the clock signal.

5 Claims, 6 Drawing Figures

FIG.6

FRAME SYNCHRONIZATION DEVICE

BACKGROUND OF THE INVENTION

1. Field of the Invention

The present invention concerns frame synchronization in a binary data transmission system in which the data is transmitted in the form of an isochronous bit stream organized into frame provided with an alignment word formed of groups of bits which may be reduced to a single element distributed through the frame.

2. Description of the Prior Art

A transmission system of this kind is used at subscriber line level in an Integrated Services Digital Network (ISDN). In this context, the subscriber terminals are placed on standby in the absence of any communication and activated at the start of each communication. Their activation, which must be as fast as possible, requires the shortest possible frame synchronization time.

Searching for an alignment word distributed through a frame is more often than not implemented with the aid of a shift register storing the data received over the duration of an alignment word with parallel outputs arranged relative to one another so as to cause to appear at certain times all the bits of an alignment word and a decoder connected to these parallel outputs of the shift register and identifying the alignement word each time that it appears.

This kind of search, which is very fast, lasting at most slightly less than the duration of two consecutive frames, often requires a shift register with a very large number of stages as it is not rare for an alignment word to extend over more than 100 bits of a frame.

To avoid this disadvantage it has been proposed to search for the alignment word by means of a series of tests consisting in searching for the first bit received compatible with the value of the first bit of the alignment word, adopting the frame subdivision corresponding to it and verifying one by one the following bits of the alignement word determined by this subdivision, any negative test entailing resumption of the synchronization procedure from the beginning. This process has the advantage of no longer requiring the memorization of all data bits received over the duration of an alignment word, but the disadvantage of being slow.

An object of the present invention is a frame synchronization process which is simple to implement and faster than that just described.

SUMMARY OF THE INVENTION

The invention consists in a frame synchronization device comprising:

timing means generating a clock signal from a selection of periods of the timing signal of the data bit stream reproducing a periodic pattern formed by relative bit locations over the duration of a frame certain at least of which are distributed according to the distribution of the bits of the alignment word within a frame and which form n groups of q elements (where n and q are integers) regularly distributed over the duration of a frame, phase shifting means for selectively applying to the clock signal a phase skip with a value equal to at least one period of the data bit stream timing signal, a serial input parallel output shift register having at least as many stages as the number of data bit locations adapted in a pattern and which is clocked by the clock signal fed to it by the timing and phase shifting means, to the input of which the data bit stream is applied, a parallel input alignment word decoder connected to the shift register outputs corresponding within a pattern to the locations of the bits of an alignment word, phase shifting control means delivering a phase shifting instruction to the phase shifting means when the decoder has not recognized the alignement word in the data bits memorized in the shift register over a minimum period of two consecutive alignment word durations.

Selecting the data bits by means of the clock signal significantly reduces the amount of data stored as one may hope to have a completed pattern featuring a period shorter relative to the duration of a frame by at least an order of magnitude. On the other hand, the selection effected may be wrong, either definitively because it does not enable all bits of the alignment word to be extracted from the data bit stream or, provisionally, because the beginning of the selection coincides with a set of bits of the alignment word which is not the starting set. The first situation requires a new selection obtained by imposing a phase skip on the clock signal and may occur a number of times in succession, although less than the number of data bit locations over which a pattern period extends. The second situation is resolved by waiting for a complete alignment word to occur in the selection, which takes at most the duration of two alignment words.

In the simplest embodiment, the shift register has a number of stages corresponding to the number of data bit locations in a pattern. The phase shifting control means generate phase shifting instructions at regular intervals equal to the duration of two frames, neglecting the phase skip imposed on said clock signal as long as the decoder does not recognize the alignment word.

In a first variant, the shift register is formed by two parts which select data in parallel and each of which has a number of stages equal to the number of data bit locations in a pattern and which are clocked by two version of the clock signal with a relative phase shift between them. The first part is clocked by a first version of the clock signal and formed by a series of presetting input and parallel output stages having a presetting control input controlled by the phase shifting control means and its parallel outputs connected to the inputs of the decoder. The second part is clocked by a second version of the clock signal phase shifted relative to the first version by an amount equal to the phase skip which the phase shifting means produce at one time, and formed by a series of stages the parallel outputs of which are connected to the presetting inputs of the registers of the first part. The phase shifting control means deliver phase shifting instructions and instructions for parallel loading of the stages of the first part of the shift register at regular intervals equal to the frame duration, ignoring the phase skip imposed on said clock signal, as long as the decoder does not recognize the alignment word. The stages of the second part of the shift register memorize the data bits according to the selection which will be obtained from the next phase skip imposed on the clock signal and permit immediate updating of the stages of the first part of the shift register as soon as this next phase skip is effected whereas without them this update would take the duration of an alignment word. This time saving permits doubling of the timing rate of the phase shifting instructions in the absence of recognition of the alignment word by the decoder.

According to a second variant, the synchronization device is further provided with a prediction circuit consisting of a decoder in parallel with the first, with inputs permutated to permit recognition of an alignment word having been subject to a rotation, and its shift register is formed by three parts which select the data bits in parallel and are clocked by three versions of the clock signal with relative phase shifts between them. The first part of the shift register is clocked by a first version of the clock signal, comprises a series of stages, the number of which is at least equal to n.q, the number of bit locations in a pattern, with parallel presetting inputs and parallel outputs connected to the inputs of the decoder and of the prediction circuit, and is provided with a presetting control input cntrolled by the phase shifting control means. The second part of the shift register is clocked by a second version of the clock signal phase shifted relative to the first by an amount equal to the phase skip generated at one time by the phase shifting means, comprises a series of stages the number of which is at least equal to n.q−1, one less than the number of bit locations in a pattern, with presetting inputs for the first stages and parallel outputs for all the stages connected to the presetting inputs of the stages of the first part, and is provided with a control input for partial presetting of its first stages controlled by the phase shifting control means. The third part of the shift register is clocked by a third version of the clock signal phase shifted relative to the second version and the first version by respective amounts equal to the duration of one phase skip and two phase skips generated at one time by the phase shifting means and has parallel output stages connected to the presetting inputs of the second part of the shift register. Assuming that the prediction circuits identifies a version of the alignment word having been subjected to a rotation corresponding to p groups of relative locations of bits of the pattern, p being an integer between 1 and n−1, the number of first stages with presetting inputs of the second part of the register is r.q, where r is the larger of the numbers p and n−p, and the third part of the register has one less stage r.q−1.

The prediction effected at the level of the selection submitted to the decoder makes it possible to reduce by at least half the minimum time to detect a wrong selection since the number p may be taken as equal to n/2 if n is even or to (n+1)/2 if n is odd, which results in synchronization being achieved virtually twice as fast.

Other characteristics and advantages of the invention will appear from the following description of various embodiments given by way of example, when considered in connection with the accompanying drawings.

DESCRIPTION OF THE PREFERRED EMBODIMENTS

Figure 1:
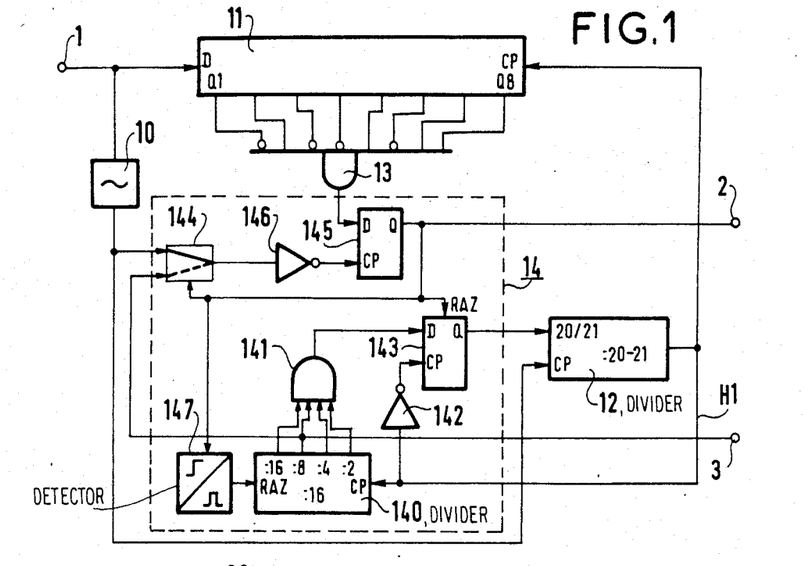
FIG. 1 is the block schematic of a synchronization device with a shift register consisting of a single set of stages.

FIG. 1 shows the block schematic of a frame synchronization device for a binary data transmission system in which the data is transmitted in the form of an isochronous bit stream at 160 kbit/s organized into frames each consisting of eight sectors of 20 bits with an alignment word of eight bits uniformly distributed having the binary value 11010010 and occupying the first bit location of each sector.

The device comprises a circuit 10 for recovering the 160 kHz timing from the data bit stream applied to an input 1 of the device, an eight-stage shift register 11 receiving the data bit stream and having a serial input and parallel output, timing means with incorporated phase shifting means consisting of a counter 12 dividing by 20 or 21 the 160 kHz timing signal provided by the timing recovery circuit 10 and delivering a clock signal H1 clocking the shift register 11, an alignment word decoder formed by an AND type logic gate 13 with eight inputs connected to the parallel outputs of the shift register 11 and certain of which are provided with an inverter to allow for the zero value of certain bits of the alignment word, and a phase shifting control circuit 14 determining according to the output signal from the decoder the value 20 or 21 by which the divider 12 divides.

The timing recovery circuit 10 is formed in the usual manner by an oscillator with a phase-locked loop which synchronizes it to the transitions in the received data bit stream applied to input 1.

The shift register 11 is of the type triggered on the rising edges of its clock signal.

The clock signal H1 applied to the shift register 11 is built up from a selection of the periods of the timing signal of the data bit stream reproducing the relative locations of the alignment word bits. In the present case the bits of the alignment word are distributed with one at the beginning of each frame sector, that is to say every 20 bits. The clock signal H2 may therefore be obtained by selecting one period in 20 of the data bit stream timing signal. The fact that only the rising edges of the clock signal H1 are effective in clocking the shift register enables selection to be limited to simple division of the data bit stream timing signal by a factor of 20.

The phase of the clock signal H1 is shifted by replacing one period of division by 20 with one period of division by 21. This amounts to retarding the phase of the clock signal H1 by steps corresponding to one period of the received data bit stream timing signal.

The phase shifting control circuit 14 comprises:
a counter 140 which divides by 16 receiving the clock signal H1 on a count input,
a decoder 141 which decodes state 15 of the counter-divider 140,
an inverter 142 inverting the clock signal H1,
a first type D flip-flop 143 triggered on the rising edges of the clock signal H1 from the inverter 142 with its D input connected to the output of the decoder 141,
a switching circuit 144 with two inputs and one output, one input being connected to the output of the data bit steam 160 kHz timing recovery circuit 10 and the other to an output of the counter-divider 140 supplying a 1 kHz clock signal,
a second type D flip-flop 145 triggered on the rising edges of the clock signal provided by the switching circuit 144, previously inverted by an inverter 146, the D input of which is connected to the output of the AND type logic gate 13 and the signal on the Q output of which is applied to a reset at zero input RAZ of the flip-flop 143 and to a control input of the switching circuit 144, said inverter 146, and a detector 147 detecting rising edges of the signal on the Q output of the flip-flop 145, controlling the reset at zero input RAZ of the counter-divider 140.

The decoder 141 consists of an AND logic gate with four inputs connected to four outputs respectively dividing by two, four, eight and sixteen of the counter-divider 140. It is used to generate a phase shifting command signal corresponding to a logic "1" at its output at the 500 Hz timing rate, that is to say with a repetition period the duration of which is equal to that of two frames of the received data bit stream.

The type D flip-flop 143 which samples the output signal of the AND type logic gate 141 at the timing rate of the clock signal H1 previously inverted by the inverter 142 controls through its Q output the input for choosing the value 20 or 21 for the divider 12, this input being assumed to be at logic "0" for division by 20 and at logic "1" for division by 21. This flip-flop 143 blocks or transmits to the divider 12 the phase shifting commands generated by the AND type logic gate 141 according to the logic state "1" or "0" then applied to its reset at zero input RAZ and maintains at 20 the value by which this counter-divider divides between two phase shifting commands.

The switching circuit 144 is controlled by the flip-flop 145 to transmit the clock signal provided by the circuit 10 or the 1 kHz clock signal available at the divide by eight output of the counter-divider 140, according to the logic level "0" or "1" of the signal at the Q output of this flip-flop.

The flip-flop 145 is used to memorise over the duration of a frame an indication of frame alignment word detection provided by the logic gate 13. The signal on its Q output which commands, as mentioned hereinabove, the flip-flop 143, the switching circuit 144 and, via the detector 147, the counter-divider 140, is further applied to an output 2 of the device; it represents by its logic state "1" or "0" that the 1 kHz clock signal at the divide by eight output of the counter divider 140 and delivered at an output 3 of the device is synchronized to the frame timing.

The phase shifting is commanded with a maximum repetition frequency of 500 Hz, that is to say every two frames of the received data bit stream. Between two phase shifting commands the shift register 11 clocked at a timing rate of 8 kHz copies one data bit in 20 of the received data bit stream. If the selection is incorrect, in other words if the data bits recorded do not concern the alignment word, then this word is not recognised by the AND type logic gate 13. The phase shifting command generated by the AND type logic gate 141 when the counter-divider 140 reaches state 15 is recorded by the flip-flop 143 and reaches the divider 12 which executes it. The next selection moves back one step relative to the ranks of the data bits in the frames, and this process continues (19 times at most) until it becomes correct and relates to the bits of the frame alignment word. The start of a correct selection does not necessarily coincide with the start of the alignment word, which generally begins by appearing trunkated. It is necessary to wait for the first complete frame alignment word to be able to recognize it, which necessarily occurs over a duration of two frame alignment words and consequently over the duration of two frames, which corresponds to the period of the 500 Hz timing rate at which the phase shifting commands are repeated. The recognition of the alignment word by the AND type logic gate 13 of the decoder results in a logic "1" on the Q output of the flip-flop 145 which serves as a frame synchronization signal applied to the output 2 of the device which resets at zero the type D flip-flop 145 and, by virtue of its occurrence, the counter-divider 140 and which sets the switching circuit 144 for transmission of the 1 kHz clock signal from the counter-divider 140; this setting of the switching circuit 144 maintains the logic "1" at the output of the flip-flop 145 and consequently prevents the recording of a phase shifting command in the type D flip-flop 143 during the duration of one period of this clock signal, that is to say during the duration of a frame. As long as the AND type logic gate 13 recognizes the alignment word at the timing rate of the 1 kHz clock signal, the type D flip-flop 143, held at logic "0", blocks any phase shifting command from the AND type logic gate 141. Loss of the alignment word provokes the reappearance of periodic phase shifting commands and a new synchronization process.

It is to be understood that the device as shown may be completed by any circuit (not shown) employing complementary synchronization acquisition or loss criteria providing in particular for authorizing the initiation of a new synchronization process by application of logic "0" to the reset at zero input RAZ of the flip-flop 143 only when a predetermined set of synchronization loss criteria are satisfied.

Figure 2:
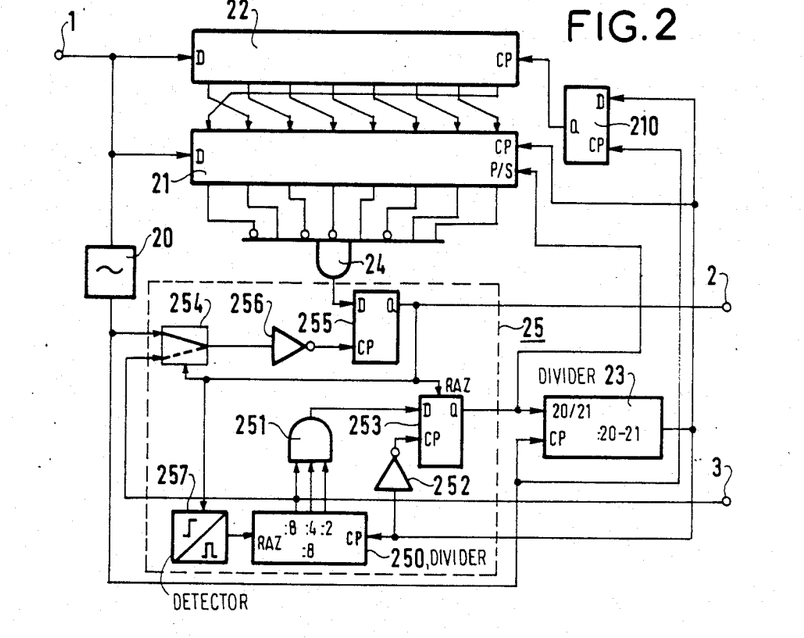
FIGS. 2, 3 and 4 are the block schematics of synchronization devices with a shift register consisting of two parallel parts.

FIG. 2 shows a variant of the preceding frame synchronization device which achieves synchronization twice as fast. This comprises a circuit 20 for recovering the 160 kHz timing from the received data bit stream, a shift register with two parallel parts 21, 22 receiving the received data bit stream applied to the input 1 of the device, timing means with built-in phase shifting means comprising a divider 23 which divides by 20 or 21 the 160 kHz timing rate from the timing recovery circuit 20 and which is the origin of the clock signals supplied to the two parts 21 and 22 of the shift register, an alignment word decoder formed by an AND type logic gate 24 with eight inputs connected to the parallel outputs of a part 21 of the shift register and certain of which are provided with inverters allowing for the zero value of certain bits of the alignment word, and a circuit 25 commanding phase shifting of the shift register clock signals determining according to the output signal from the decoder the choice of the value 20 or 21 by which the divider 23 divides.

Like the timing recovery circuit 10 previously, the timing recovery circuit 20 is formed by an oscillator provided with a phase-locked loop which synchronized it to the transitions of the received data bit stream applied to the input 1 of the device.

The shift register has two parallel parts 21 and 22 of the type triggered on the rising edges of the clock signal. Each has a serial input to which is applied the received data bit stream and eight register stages with parallel outputs; they are clocked by two versions of the 8 kHz clock signal delivered by the divider 23 which divides by 20 or 21, with a relative phase shift between them.

The first part 21 of the shift register is formed by register stages having parallel presetting inputs which are connected to the parallel outputs of the stages of the register of the second part 22 of immediately lower rank with the exception of the presetting parallel input of the first stage which is connected to the output of the last stage of the register of the second part 22. This first part comprises a presetting control input P/S active at logic "1" controlled by the phase shifting control circuit 25. It receives on its clock input CP the clock signal delivered by the divider 23 which divides by 20 or 21. The second part 22 of the shift register has its clock input CP connected to the output of the divider 23 which divides by 20 or 21 through the intermediary of a type D flip-flop 210 which is rising edge triggered and clocked by the 160 kHz timing rate delivered by the timing recovery circuit to impose on the clock signal a delay equal to the duration of a received data bit.

This second part 22 effects a data selection retarded by one step relative to that effected by the first part 21. As the phase skips are obtained, as previously, by replacing in the clock signal one period of division by 20 with one period of division by 21 and correspond to retardations of one step in the data bit stream frames, the selection effected by the second part 22 of the shift register is that which will be effected by the first part 21 of the shift register after the next phase shifting command is executed. The content of the second part 22 of the shift register therefore provides for immediate updating of the content of the first part 21 after each phase skip, eliminating a wait of one synchronization word duration. As the stage contents are transferred during one clock time, due account is taken of the missing shift by a shift between the ranks of the parallel presetting inputs of the register stages of the first part 21 and the ranks of the parallel outputs of the output stages of the second part 22 which are connected to them.

Alternatively (not shown), the presetting input of the first stage of the first part 21 of the shift register is connected to the input 1 of the device in parallel with the serial inputs of the two parts of the register, the output of the second stage of the second part 22 of the register no longer being used.

The phase shifting control circuit comprises, as previously:

a counter-divider 250 receiver on a counter input the clock signal delivered by the divider 23, but this counter-divider 250 divides only by eight because of the time saving obtained by the parallel updating of the first part 21 of the shift register, a decoder 251 which now decodes state 7 rather than state 15 of the counter-divider 250, an inverter 252 for inverting the clock signal delivered by the divider 23, a first type D flip-flop 253 triggered on rising edges of the clock signal from the inverter 252 and the D input of which is connected to the output of the decoder 251, a switching circuit 254 with two inputs and one output, one input of which is connected to the output of the data bit stream 160 kHz timing recovery circuit 20 and the other to an output of the counter-divider 250 supplying a 1 kHz clock signal, a second type D flip-flop 255 triggered on rising edges of the clock signal delivered by the switching circuit 254, previously inverted by an inverter 256, the D input of which is connected to the output of the AND type logic gate 24 and the signal on the Q output of which is applied to a reset at zero input RAZ of the flip-flopnd to a control input of the switching circuit 254, said inverter 256, and a detector 257 for detecting rising transitions of the signal on the Q output of the flip-flop 255, controlling the resetting at zero of the counter-divider 250.

The decoder 251 consists of an AND type logic gate with three inputs connected to three outputs respectively dividing by two, four and eight of the counter-divider 250. It is used to generate a phase shifting command corresponding to a logic "1" on its output at the 1 kHz timing rate, in other words with a repetition period duration equal to that of one frame of the received data bit stream.

The type D flip-flop 253 which samples the output signal of the AND type logic gate 251 at the timing rate of the clock signal supplied by the divider 23, previously inverted by the inverter 252, controls via its Q output the input for choosing the value 20 or 21 by which the divider 23 divides, this input being assumed to be at logic "0" for division by 20 and at logic "1" for division by 21. This flip-flop 253 blocks or transmits to the divider 23 phase shifting commands generated by the AND type logic gate 251 according to the logic state "1" or "0" then applied to its reset at zero input RAZ and holds at 20 the value by which this counter-divider divides between two phase shifting commands. The signal on the Q output of the flip-flop 253 is applied to the presetting control input P/S of the first part 21 of the shift register to command the transfer of the contents of the stages of the second part 22 of the shift register into the stages of the first part 21 of this register on insertion of a phase shift into the clock signal delivered by the divider 23.

The switching circuit 254 is controlled by the flip-flop 255 for transmitting the clock signals supplied by the circuit 20 or the 1 kHz clock signal available at the divide by eight output of the counter-divider 250, according to the logic state "0" or "1" of the signal at the Q output of this flip-flop.

The flip-flop 255 is used to memorize over the duration of one frame a frame alignment word detection indication provided by the logic gate 24. The signal on its Q output which, as previously mentioned, controls the flip-flop 253, the switching circuit 254 and, through the intermediary of the detector 257, the counter-divider 250, is applied to the output 2 of the device; it represents by its logic state "1" or "0" that the 1 kHz clock signal available at the divide by eight output of the counter-divider 250 and delivered on the output 3 of the device is synchronized to the frame timing.

Phase shifting is commanded at most with a repetition frequency of 1 kHz, in other words every frame of the received bit stream. Between two phase shifting commands, the first part 21 of the shift register copies the data selection effected by the second part 22 and then continues this selection while the second part 22 of the shift register begins the next selection. If the selection of the first part 21 of the shift register is not the correct one, the memorized data bits not forming part of the frame alignment word, this word is not recognized by the decoder 24 which fails to cancel the next phase shifting command generated by the AND type logic gate 251; this phase shifting command is recorded by the type D flip-flop 253 to be executed and provoke a change of selection, this occuring repeatedly (19 times at most) until correct selection is achieved.

When a correct selection appears, the decoder examines from the outset a selection of the bits of the alignment word transferred from the second part 22 of the shift register and formed, in general, by the juxtaposition of the end of one alignment word and the beginning of the next. At the end of a period equal at most to the duration of an alignment word, the next alignment word is completed and recognized by the decoder 24 which results in a logic "1" at the Q output of the flip-flop 255 which is used as a frame synchronization signal applied to the output 2 of the device and which resets at zero the type D flip-flop 253 and, by virtue of its appearance, the counter-divider 250 and which sets the switching circuit 254 for transmission of the 1 kHz clock signal from the counter-divider 250; this setting of the switching circuit 254 maintains the logic "1" at the output of the flip-flop 255 and consequently prevents recording of a phase shifting command in the type D flip-flop 253 during the duration of one period of this clock signal, that is to say during the duration of one frame. As long as the decoder 24 recognizes the alignment word at the timing rate of the 1 kHz clock signal, the type D flip-flop 253, held at zero, blocks any phase shifting command from the AND type logic gate 251.

The loss of an alignment word causes the reappearance of periodic phase shifting commands leading to a new synchronization process.

As previously, it is to be understood that the device shown may be completed by any form of circuit (not shown) for implementing complementary synchronization acquisition or loss criteria, providing in particular for authorizing the initiation of a new synchronization process, by application of logic "0" to the reset at zero input RAZ of the flip-flop 253, only when a predetermined set of synchronization loss criteria are satisfied.

Figure 3:
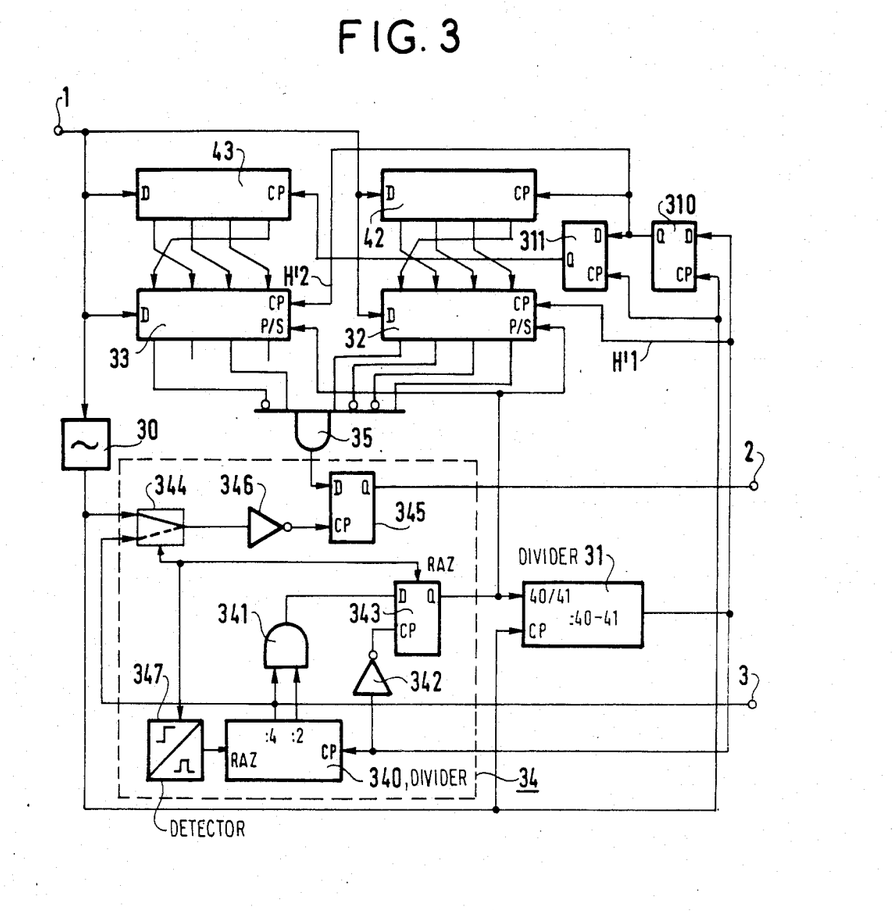

FIG. 3 shows a first adaptation of the synchronization device from FIG. 2 to an alignment word which is not uniformly distributed within a frame, the 160 kbit/s isochronous data bit stream being organized into frames each consisting of four sectors of 40 bits with a six-bit alignment word 101010 distributed as follows: one bit of value 1 at the start of the first sector, a group of two bits of value 01 at the start of the second sector, one bit of value 0 at the start of the third sector and a group of two bits of value 10 at the start of the fourth sector.

To generate the pattern from which the clock signal for the shift register is derived, the synchronization word is completed as follows: 1 x 010 y10, where x and y are data bits in the second position in the first and third sectors, respectively. This enables a pattern formed of four groups of two bits each placed at the start of a sector to be derived. Subsequently this pattern is regarded as two juxtaposed sub-patterns on four bits 1001 and x 1 y 0 each uniformly distributed in the frames, and the two clock signals H'1 and H'2 respectively corresponding to the sub-patterns are generated. These two clock signals H'1 and H'2 are formed here by two versions of a 4 kHz signal with a relative phase shift between them of one period of the received data bit stream binary bit rate.

To this end the circuit comprises a circuit 30 for recovering the 160 kHz timing of the binary data bit stream received applied to the input 1 of the device followed by a divider 31 which divides by 40 or 41 and delivers the clock signals H'1 and H'2, one (H'1) directly and the other (H'2) through the intermediary of a time-delay circuit formed by a type D flip-flop 310 clocked by the 160 kHz timing signal provided by the timing recovery circuit 30.

Each of the two parts of the shift register is subdivided into two.

The first part of the shift register has two elements 32, 33 in parallel, each comprising four register stages with serial data input, parallel presetting inputs and parallel outputs, the presetting control inputs of which are connected in parallel and the clock inputs of which are clocked in the case of one of them (32) by the clock signal H'1 and in the case of the other (33) by the clock signal H'2.

The second part of the shift register has two elements 42, 43 in parallel each of four register stages with serial data inputs and parallel outputs.

Alternatively (not shown), the presetting input of the first stage of each of the two elements 32 and 33 of the first part of the shift register is connected to the input 1 of the device, in parallel with the serial inputs of the four elements 32, 33, 42, 43, the outputs of the last stages of the two elements 42 and 43 of the second part of the shift register no longer being used.

The first element 42 of the second part of the shift register has the parallel outputs of its registers connected to the presetting inputs of the register stages of immediately higher rank of the first element 32 of the first part of the shift register with the exception of the last output which is connected to the first input. It receives clock signal H'2 delayed by one timing period of the received data bit stream relative to that H'1 applied to the first element 32 of the first part of the shift register. Together with this first element 32, it provides for searching the received binary bit stream frames for the elements of the alignment word sub-pattern 1001.

The second element 43 of the second part of the shift register has the parallel outputs of its register stages connected to the presetting inputs of the register stages of immediately higher rank of the second element 33 of the first part of the shift register, with the exception of the last output which is connected to the first input. It receives a clock signal retarded by one timing period of the received data bit stream relative to that H'2 applied to the second element 33 of the first part of the shift register, this clock signal received by the second element 43 being obtained from the clock signal H'2 by means of a time-delay circuit formed by a type D flip-flop 311 clocked by the recovered 160 kHz timing. With the second element 33, it provides for searching the received binary bit stream frames for the elements of the sub-pattern x 1 y 0 of the alignment word.

The divider 31 which divides by 40 or 41 has an input for selecting the value 40 or 41 by which it divides, at logic "1" when it divides by 41 and at logic "0" when it divides by 40. This selection input is controlled by a phase shift control circuit 34 of the same design of that 35 in the previous figure, with the exception of the counter-divider 340 which divides by four and not by eight and the decoder 341 which consists of an AND type logic gate with two inputs decoding state three of the counter-divider 340 to deliver a signal at 1 kHz defining the repetition rate of the phase shifting commands in the absence of frame alignment word recognition. The phase shift control circuit 34 also controls selection of parallel or serial loading of the two elements 32 and 33 of the first part of the shift registers whose presetting control inputs receive from the circuit 34 the same signal as the inputs selecting the division factor of the divider 31.

Like the decoder 24 previously, the decoder 35 consists of an AND type logic gate with a number of inputs certain of which are preceded by inverters. There are six of these inputs, this being the number of bits in the new alignment word under consideration, and the parallel outputs of the first elements 32, 33 of the first part of the shift register no longer have ranks which are inversely proportional to those of the bits of the frame alignment word that they are used to locate, the first, second, fourth and fifth bits of the frame alignment word being respectively obtained on the fourth, third, second and first outputs of the first element 32 of the first part of the shift register and the third and sixth bits of the frame alignment word being respectively obtained on the third and first outputs of the second element 33 of the first part of the shift register.

Operation is in all respects analogous to that of the device previously described in relation to FIG. 2.

Figure 4:
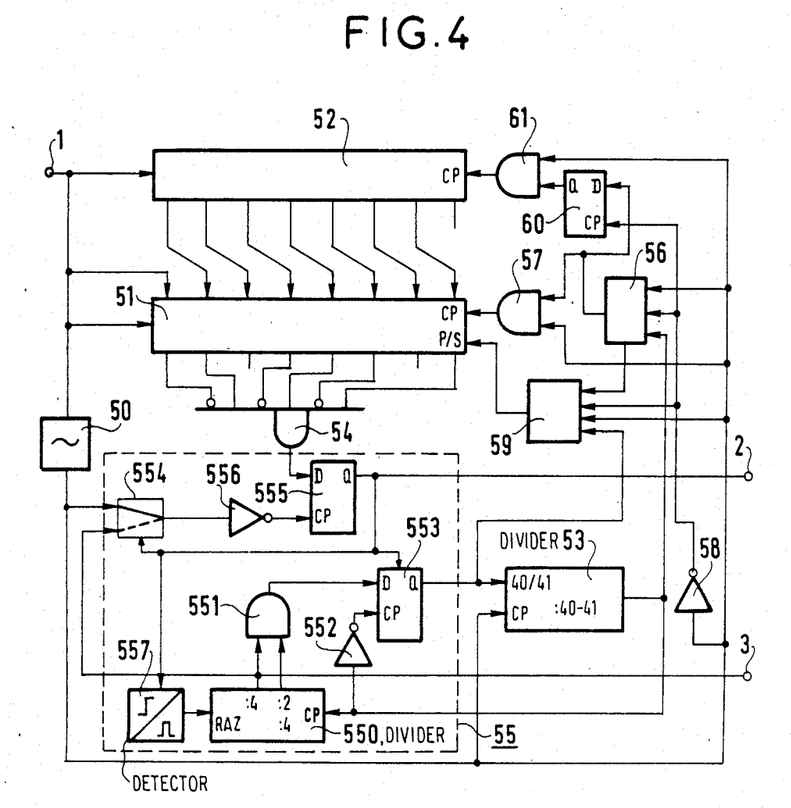

FIG. 4 shows another adaptation of the synchronization device of FIG. 2 to a transmission system utilizing a 160 kbit/s isochronous data bit stream organized into frames each consisting of four sectors of 40 bits with, as in the preceding case, a six-bit alignment word 101010 distributed as follows: one bit at 1 at the beginning of the first sector, a group of two bits of value 01 at the beginning of the second sector, one bit at 0 at the beginning of the third sector and a group of two bits of value 10 at the beginning of the fourth sector.

As previously, the pattern from which the shift register clock signal is derived is obtained by completing the alignment word so as to transform it into four groups of two bits regularly distributed within a frame: 1 x 010 y 10, where x and y are the second data bits in the first and third sectors, respectively. The pattern is considered in its entirety and a clock signal is generated by selecting periods of the data timing signal reproducing this pattern, that is to say by selecting two consecutive periods of the data timing signal repeated at a timing rate of 4 kHz.

The circuit employed differs only slightly from that of FIG. 2. Like the latter, it comprises a circuit 50 for recovering the 160 kHz timing from the received data bit stream applied to the input 1 of the circuit, a shift register with two parallel parts 51, 52 receiving the received data bit stream, timing means with built-in phase shifting means comprising a divider 53 dividing by 40 or 41, an alignment word decoder fromed by an AND type logic gate 54 with six inputs connected to parallel outputs of the part 51 of the shift register and certain of which are provided with inverters to allow for the zero value of certain bits of the alignment word, and a circuit 55 controlling phase shifting of the shift register clock signals determining the choice of the value 40 or 41 by which the divider 53 divides.

The divider which divides by 40 or 41 has an input for selecting the value by which it divides, at logic "1" when it divides by 41 and at logic "0" when it divides by 40. This selection input is controlled by the phase shifting control circuit 55 which is of the same design as that 25 of FIG. 2 except for the counter-divider 550 which divides by four rather than by eight and the decoder 551 which consists of an AND type logic gate with two inputs decoding state 3 of the counter-divider 550 to deliver a signal at 1 kHz defining the repetition rate of the phase shifting commands in the absence of frame synchronization word recognition.

The two parts 51, 52 of the shift register are identical to those 21, 22 of the shift register of the circuit in FIG. 2 and have the same interconnections, except that the presetting input of the first stage of the first part 51, which may be connected either to the output of the last stage of the second part 52 or in parallel with the serial inputs of the two parts 51 and 52, is shown here connected in parallel with these serial inputs, although they are not clocked in the same way.

The first part 51 has its clock input connected to the output of the divider 53 which divides by 40 or 41 through the intermediary of a first circuit generating pairs of pulses and passing the first and second period of the received data timing signal following each rising edge of the 4 kHz signal delivered by the divider 53.

This first pulse pair generator circuit comprises a circuit 56 receiving the signal at 4 kHz delivered by the divider 53 and also, on the one hand directly and on the other hand through an inverter 58, the received data timing signal delivered by the circuit 50, to generate after each rising edge of the 4 kHz signal delivered by the divider 53 a pulse at logic "1" beginning one half-period of the received data timing signal after this rising edge and extending over a duration equal to that of two periods of the received data timing signal, and an AND type logic gate 57 controlled by this circuit 56 and also receiving the received data timing signal. This first part 51 also has its presetting control input P/S connected to the Q output of the first type D flip-flop 553 of the phase shifting control circuit 55 through the intermediary of a circuit 59 maintaining logic "0" at the presetting control input P/S during the second pulse of each pair generated by the first pulse pair generator circuit.

The second part 52 of the shift register has its clock input connected to the output of the divider 53 through the intermediary of a second pulse pair generator passing the second and third periods of the data timing signal after each rising edge of the signal delivered by the divider 53.

This second pulse pair generator circuit comprises the circuit 56, which is thus common to both pulse pair generator circuits, a type D flip-flop 60 clocked by the received data timing signal previously inverted by the inverter 58 and the D input of which is connected to the output of the circuit 56, so delaying by the duration of one period of the received data timing signal the pulses generated by the circuit 56, and an AND type logic gate 61 controlled by the signal on the Q output of the flip-flop 60 and also receiving the received data timing signal.

The decoder consists of an AND type logic gate 54 of which the six inputs are connected to the first, second, fourth, fifth, sixth and eighth parallel outputs of the first part of the shift registers on which are obtained the bits of the alignment word in the reverse order. The third and seventh outputs are ignored as they correspond to the elements y and x which were used to complete the synchronization word in order to obtain a regular pattern.

Figure 5:
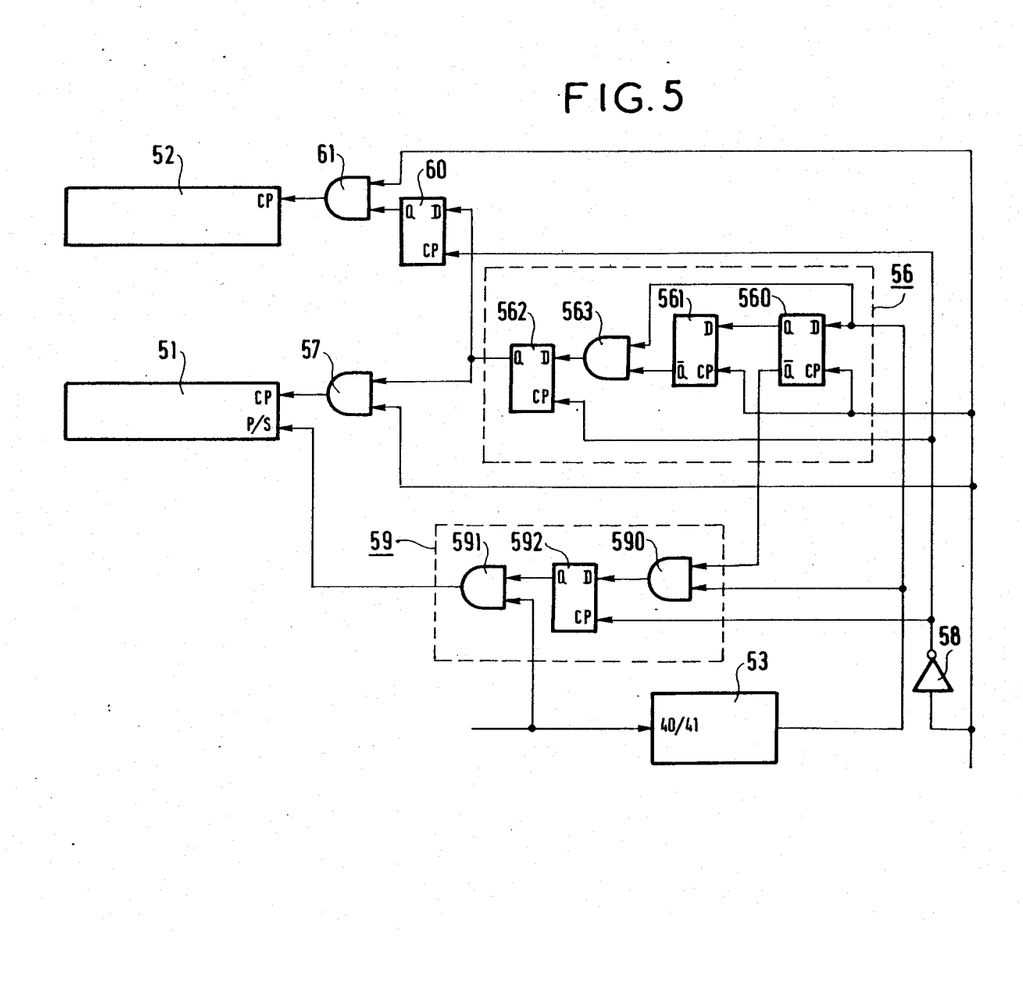
FIG. 5 shows in detail particular circuits of the device shown in FIG. 4.

FIG. 5 shows in detail one embodiment of the circuits 56 and 59. The circuit 56 comprises three rising edge triggered type D flip-flops 560, 561 and 562 and an AND type logic gate 563. The first and second flip-flops 560 and 561 are connected in series and clocked by the received data timing signal, the first flip-flop 560 receiving on its D input the 4 kHz signal delivered by the divider 53; they delay the 4 kHz signal delivered by the divider 53 by a duration equal to two periods of the received data timing signal. The gate 563 has two inputs connected one to the output of the divider 53 and the other to the $\overline{Q}$ output of the flip-flop 561; it generates on each rising edge of the 4 kHz signal delivered by the divider 53 a pulse at logic "1" beginning on this rising edge and extending over two periods of the received data timing signal. The third flip-flop 562, whose Q output constitutes the output of the circuit 56, is clocked by the received data timing signal previously inverted by the inverter 58 and has its D input connected to the output of the gate 563; it delays the pulses generated by this gate by one half-period of the received data timing signal.

The circuit 59 comprises two AND type logic gates 590 and 591 and a rising edge triggered type D flip-flop 592. The first AND type gate 590 has two inputs connected one to the output of the divider 53 and the other to the $\overline{Q}$ output of the flip-flop 560 of the circuit 56; it generates on each rising edge of the 4 kHz signal delivered by the divider 53 a pulse at logic "1" beginning on this rising edge and extending over one period of the received data timing signal. The flip-flop 592, clocked by the received data timing signal previously inverted by the inverter 58, has its D input connected to the output of the gate 590; it delays the pulses generated by this gate by half-period of the received data timing signal. The second AND type gate 591, whose output constitutes that of the circuit 59, has two inputs connected one to the Q output of the flip-flop 592 and the other to the output of the phase shift control circuit 55 connected to the input for selecting the division factor of the divider 53; in the presence of a phase shifting command which also constitutes a presetting command for the first part 51 of the shift register, this gate 591 passes to the presetting control input P/S of this first part 51 the pulse then delivered by the flip-flop 592, this pulse beginning one half-period of the received data timing signal before the first pulse of the pair of pulses then generated by the first pulse pair generator circuit and ending at the same time as this first pulse; thus the first part 51 of the shift register is only preset on this first pulse; in the absence of any presetting command, the gate 591 maintains logic "0" at the presetting control input P/S of the first part 51 of the shift register.

Figure 6:
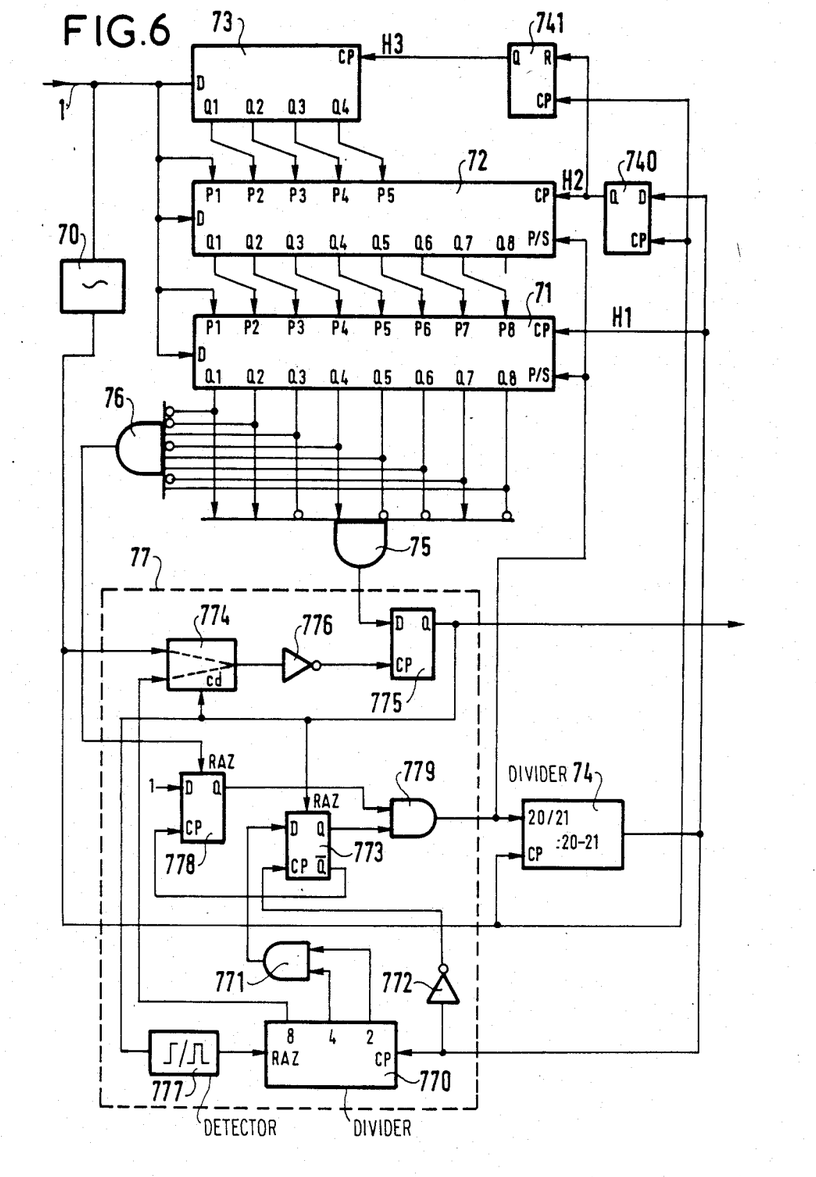
FIG. 6 shows the block schematic of a synchronization device with a prediction circuit and a shift register consisting of three parallel parts.

FIG. 6 shows the block schematic of a frame synchronization device which is faster than the preceding ones, designed for a binary data transmission system in which the data is transmitted in the form of a 160 kbit/s isochronous bit stream organized into frames each consisting of eight sectors of 20 bits with an alignment word of eight bits uniformly distributed having the binary value 11010010 and occupying the first bit location in each sector.

The device comprises a circuit 70 for recovering the 160 kHz timing of the data bit stream applied to input one of the device, a shift register with three parallel parts 71, 72, 73 receiving the received data bit stream, timing means with built-in phase shifting means comprising a divider 74 which divides by 20 or 21 the 160 kHz timing frequency delivered by the timing recovery circuit 70 and which provides the basis for the clock signals supplied to the three parts 71, 72, 73 of the shift register, an alignment word decoder formed by an AND type logic gate 75 with eight inputs connected to the parallel outputs of the eight-stage first part 71 of the shift register, certain of which are equipped with inverters to allow for the zero value of certain bits of the alignment word, a prediction circuit formed by an AND type logic gate 76 with eight inputs connected to the parallel outputs of the eight-stage first part 71 of the shift register and certain of which are equipped with converters to take account of the zero value of certain bits of the permutated version of the alignment word which is obtained by rotating half the bits of the latter, and a circuit 77 controlling phase shifting of the shift register clock signals determining according to the output signals of the decoder and the prediction circuit the value 20 or 21 by which the divider divides.

The timing recovery circuits 70 is formed, in the usual manner, by means of an oscillator provided with a phase-locked loop which synchronizes it on the transitions of the received data bit stream applied to the input 1.

The shift register has three parallel parts 71, 72, 73 of the type advanced on the rising edges of the clock signal. Each has a serial input to which is applied the received data bit stream available on the input 1 and they are clocked by respective versions of the 8 kHz clock signal delivered by the divider 74 which divides by 20 or 21 with relative phase shifts between them.

The first part 71 of the shift register is that which selects the data being analyzed by the alignment word decoder 75 and by the prediction circuit 76. It is formed from eight register stages provided with presetting parallel inputs connected to the parallel outputs of the register stages of the second part 72 of immediately lower rank, with the exception of the presetting parallel input of the first stage which is connected in parallel with the serial input to the input 1 of the device. This first part 71 comprises a presetting control input P/S active at logic "1" and controlled by the phase shifting control circuits 77. It receives on its clock input CP a first version H1 of the clock signal delivered directly by the divider 74 which divides by 20 or 21.

The second part 72 of the shift register prepares the way for the next selection of data in the event that the selection effected in the first part 71 does not contain the alignment word. It permits immediate loading of all the stages of the first part. Without it, it would by necessary to wait for the duration of one frame on each change of selection for all the stages of the first part 71 to be loaded according to the new selection. It is formed from seven register stages but only the first five of these are provided with presetting inputs which, like those of the first part, are connected to the parallel outputs of the register stages of the third part 73 of immediately lower rank, with the exception of the presetting parallel input of the first stage which is connected in parallel with the serial input to the input 1 of the device. This second part comprises a presetting control input P/S for its first five stages which is active at logic "1" and connected in parallel with the presetting control input of the first part 71. It receives on its clock input CP a second version H2 of the clock signal which is delivered by the divider 74 which divides by 20 or 21 through the intermediary of à D type flip-flop 740 which imposes on it a time-delay equal to the duration of the received data bit. Because of this, it effects a data selection retarded by one step in the data bit stream frames relative to that made by the first part. As the transfer of the contents of the stages of the second part 72 into the stages of the first part 71 occurs during one clock time, provision is made for the missed shift by a shift between the ranks of the presetting parallel inputs of the register stages of the first part 71 and the ranks of the parallel outputs of the register stages of the second part which are connected to them.

The difference between the number of stages in the first part of the shift register and the second part 72 is one. Completely loading the second part 72 through its serial input on each new selection would take, as is the case with the first part, a period approximately the same as the duration of a frame, whereas the time to analyze a selection is shorter by half.

The third part 73 makes it possible to speed up this loading to render it compatible with the analysis time. It is formed of four register stages with a serial input connected to the input 1 of the device and receives on its clock input CP a third version H3 of the clock signal which is delivered by the divider 74 which divides by 20 or 21 through the intermediary of two type D flip-flops, the flip-flop 740 and a flip-flop 741 collected in cascade which impose on it a time-delay equal to the duration of two received data bits. Because of this, it effects a selection of data in the frames of the received data bit stream delayed by one step relative to that done by the second part 72. Its content enables immediate updating of the first register stages of the second part 72, commensurately producing its loading time via its serial input.

The phase shifting control circuit 77 comprises:

a counter 770 which divides by eight receiving on its count input the first version H1 of the clock signal delivered by the divider 74 which divides by 20 or 21, a generator for timing the change of selection every half-frame formed by an AND type logic gate 771 with two inputs connected to the outputs of the first two stages of the counter 770 which divides by eight, a clock signal inverter 772, a first rising edge triggered type D flip-flop 773 clocked by the clock signal H1 previously complemented by the inverter 772 and the data input of which is connected to the output of the AND type logic gate 771, a switching circuit 774 with two inputs and one output, one input of which is connected to the output of the circuit for recovering the 160 kHz timing from the data bit stream and the other input of which is connected to the output of the third stage of the counter 770 which divides by eight supplying a 1 kHz timing signal C, a second rising edge triggered type D flip-flop 775 clocked by the signal delivered by the switching circuit 774 previously complemented by an inverter 776, the data input D of which is connected to the output of the AND type logic gate 775 constituting the alignment word decoder and the Q output signal of which is used to command resetting at zero of the first type D flip-flop controlling addressing of the switching circuit 774 and is used to generate through the intermediary of a monostable 777 synchronization pulses applied to the input for resetting at zero the counter 770 which divides by eight, a third rising edge triggered type D flip-flop 778 clocked by the complemented $\overline{Q}$ output signal of the first type D flip-flop 773 the data input D of which is held at logic "1" and the reset at zero input RAZ of which is controlled by the output of the AND type logic gate 76 constituting the prediction circuit, and an AND type logic gate 779 with two inputs connected to the Q outputs of the first and third type D flip-flops 773, 778 and which delivers the output signal of the phase shifting control circuit.

The second type D flip-flop 775 samples the logic state at the output of the AND type logic gate 75 constituting the alignment word decoder either, when alignment is not effective, on the appearance of each new data bit, the 160 kHz signal from the timing recovery circuit being applied to it through the switching circuit 774, or, when alignment is effective, on the appearance of each new frame alignment word, the 1 kHz signal from the counter-divider 770 synchronized on the first alignment word detection being applied to it through the switching circuit the addressing control input of which has changed state.

The rising edge responsive monostable 777 handles, as has just been seen, synchronization of the counter 770 which divides by eight with the first alignment word detection.

Together with the AND type logic gate 771, the first type D flip-flop 773 isolates states four and zero of the counter 770 which divides by eight during which the phase shifting commands may be produced. This selection is inhibited on each detection of an alignment word by a reset at zero command effected by the second type D flip-flop 775.

The third type D flip-flop 778 is used as a register for memorizing, over successive time intervals with a duration of one half-frame and which are determined by the counter-divider 770, the pulses generated by the logic gate 76 on each recognition by the prediction circuit of the version of the alignment word obtained by rotation of half its terms. It is initialized to logic "1" after each passage through the zero or four state of the counter-downcounter 770 by means of the rising transition of the signal at the inverted $\overline{Q}$ output of the first type D flip-flop 773 and set to zero by the logic gate 76.

The AND type logic gate 779 passes the output pulse from the first type D flip-flop which, when it exists, corresponds to the zero or four count states of the counter-divider 770 effective as phase shifting and parallel loading commands for the first and second parts 71 and 72 of the register when the Q output of the third D flip-flop has remained at logic "1" reflecting the absence of any pulse at the output of the logic gate 76 constituting the prediction circuit.

In general terms, the synchronization circuit operates as follows:

At any time, three separate data selections are passing or beginning to pass into the three parts 71, 72, 73 of the shift register, the first part 71 being constantly filled with data bits belonging to a first selection subject to analysis by the prediction circuit and the alignment word decoder, the second and third parts 72 and 73 requiring four periods of the 8 kHz clock signal on each change of selection to be filled with data bits belonging to the same selection.

Each time that the counter-divider 770 state passes though zero or four, the phase shifting control circuit generates a phase shifting instruction which brings about a change of selection unless it is prevented from doing so by the decoder or the prediction circuit having detected the alignment word or the permutated version thereof in the meantime.

If a new selection is not correct, in other words does not enable the alignment word to be isolated, any new zero or four state of the counter-divider 770 produces a pulse at the output of the first flip-flop 773 which is transmitted as a phase shifting or change of selection instruction by the logic gate 779 which is held open by logic "1" at the output of the third flip-flop.

If the new selection is correct, two events may occur during the first four shifts:

1. The alignment word appears. It then produces logic "1" at the output of the logic gate 75 constituting the alignment word decoder which is immediately transmitted to the frame alignment word detection output VT by the second flip-flop 775, blocks any subsequent phase shifting command by setting at zero the first flip-flop 73 and prepares the way for detection of the alignment word of the next frame by setting at zero the counter-divider 770 and adopting a clock timing rate of 1 kHz instead of 160 kHz.

2. The alignment word does not appear but should appear during the next four shifts. In this case, the permutated version of the alignment word resulting from rotation of four of its elements necessarily appears and produces a pulse at the output of the logic gate 76 constituting the prediction circuit. This pulse resets the third flip-flop 778 at zero blocking the logic gate 779 and preventing transmission of the next phase shifting command. The same selection is therefore retained after the fourth shift for the next four shifts during which the alignment word necessarily appears, which amounts to the same thing as the first case.

The device which has just been described is designed for synchronization on an alignment word having an even number n of elements and utilizes a prediction circuit decoding a version of the alignment word having been subjected to a rotation of n/2 elements. It is obvious that it may be adapted for synchronization on an alignment word having an odd number of elements. It would then use a prediction circuit decoding a version of the alignment word having been subjected to a rotation of $(n+1)/2$ or $(n-1)/2$ elements with a minimum analysis time for each selection corresponding to the passage of $(n+1)/2$ terms of the alignment word always assumed to have its bits regularly distributed within a frame. More generally, a prediction circuit may be chosen decoding a version of the alignment word having been subjected to a rotation of p elements with a minimum analysis time on each selection corresponding to the passage of the larger number of terms p or $n-p$ of the alignment word.

In the synchronization devices described by way of example, the phase skip which the variable division factor divider has applied to the clock signal which it delivers delays this clock signal. Provision could be made for imposing a phase skip which advances this clock signal: in the case where the data selections are done in an interleaved manner with a two-part shift register, the presetting input of the first part of the shift register would then be connected to the parallel outputs of the stages of the second part of the immediately higher rank with the exception of the input of the last stage which would be connected to the output of the first stage of the second part, and the version of the clock signal clocking this second part would be in advance of that clockin the first; in this case, the implementations would nevertheless be more complex since the transfer to the first part of the shift register of the data bits memorized in the second part would take place not just after each phase skip in the clock signal, but just before it, the recognition of an alignment word by the decoder could thus be effective either when it is the version of the clock signal clocking the seocnd part of the shift register which has the correct phase or when it is that clocking the first part which has it; a doubt resolving circuit would then be necessary.

In the two synchronization devices described by way of example with reference to FIGS. 3 and 4, there was adopted, for defining the shift register clock signal, the minimum pattern providing for obtaining from the frame alignment word a set of groups of bits of the same size, regularly distributed within the frame. In certain application situations it may be advantageous to adopt a non-minimal pattern featuring groups of bits without overlapping with the bits of the synchronization word, with the objective of increasing the periodicity of the pattern and so reducing the maximal number of unit phase skips to be effected to obtain a correct selection. Thus, in the preceding case, where the pattern adopted comprises four groups of two bits uniformly distributed within the 160 bits of a frame, the maximum number of unit phase skips to be effected to obtain a correct selection is 39. If this pattern is completed by four other groups of two bits regularly distributed together with the previous four within a frame, the pattern would feature a group of two bits every 20 frame bits and the maximal number of unit phase skips to be effected to obtain a correct selection would only be 19. On the other hand, doubling the length of the pattern would entail doubling the length of the shift register.

It will be understood that various changes in the details, materials and arrangements of parts which have been herein described and illustrated in order to explain the nature of the invention may be made by those skilled in the art within the principle and scope of the invention as expressed in the appended claims.

There is claimed:

1. A frame synchronization device in a binary data transmission system in which the data is transmitted in the form of an isochronous bit stream organized into frames each provided with an alignment word with bits distributed within the frame, said device comprising:

timing means for obtaining a recovered timing from the data bit stream and for generating a clock signal from said recovered timing by selecting periods of said recovered timing signal which correspond to a periodic pattern of bit locations over the duration of a frame with at least some of said bit locations corresponding to the bits of the alignment word within a frame, said periodic pattern of bit locations comprising n groups of q bit locations (where n and q are integers) regularly distributed over the duration of a frame;

phase shifting means responsive to a phase shifting instruction for selectively shifting the phase of said clock signal by an amount equal to at least one period of said recovered timing;

a serial input parallel output shift register having at least as many stages as the number of data bit locations in said periodic pattern and which is clocked by said clock signal fed to it by the timing and phase shifting means, said shift register receving said data bit stream at its input;

a parallel input alignment word decoder connected to the shift register outputs which correspond within a pattern to the locations of the bits of an alignment word; and phase shifting control means delivering said phase shifting instruction to said phase shifting means when said decoder has not recognized the alignment word in the data bits within said shift register during a minimum period of two consecutive alignment word durations.

2. Device according to claim 1, wherein said phase shifting means delays said clock signal and the presetting inputs of the first part of the shift register are connected to the parallel outputs of the stages of immediately lower rank of the second part of the shift register, with the exception of the first input which is connected to the output of the last stage of the second part of the shift register.

3. A frame synchronization device in a binary data transmission system in which the data is transmitted in the form of an isochronous bit stream organized into frames each provided with an alignment word with bits distributed within the frame, said device comprising:

timing means for obtaining a recovered timing from the data bit stream and for generating a clock signal from said recovered timing by selecting periods of said recovered timing signal which correspond to a periodic pattern of bit locations over the duration of a frame with at least some of said bit locations corresponding to the bits of the alignment word within a frame, said periodic pattern of bit locations comprising n groups of q bit locations (where n and q are integers) regularly distributed over the duration of a frame;

phase shifting means responsive to a phase shifting instruction for selectively shifting the phase of said clock signal by an amount equal to at least one period of said recovered timing;

means for generating first and second versions of said clock signal phase shifted relative to one another by an amount equal to the phase shift by said phase shifting means;

a shift register formed of first and second parallel parts with serial inputs and parallel outputs which are clocked by said first and second versions of said clock signal and which receive in parallel said data bit stream, the first part being clocked by said first version of said clock signal and having (n·q) stages with presetting inputs and a presetting control input controlled by phase shifting control means; the second part being clocked by said second version of the clock signal, said second part of said shift register having at least (n·q−1) stages and having its parallel outputs connected to the presetting inputs of the stages of the first part;

a parallel input alignment word decoder connected to the outputs of the first part of the shift register which correspond within a pattern to the locations of the bits of an alignment word; and phase shifting control means delivering said phase shifting instruction to said phase shifting means and a parallel loading instruction to said presetting control input of said first part of the shift register when said decoder has not recognized the alignment word in the data bits within said shift register during a minimum period of two consecutive alignment word durations.

4. A frame synchronization device in a binary data transmission system in which the data is transmitted in the form of an isochronous bit stream organized into frames each provided with an alignment word with bits distributed within the frame, said device comprising:

timing means for obtaining a recovered timing from the data bit stream and for generating a clock signal from said recovered timing by selecting periods of said recovered timing signal which correspond to a periodic pattern of bit locations over the duration of a frame with at least some of said bit locations corresponding to the bits of the alignment word within a frame, said periodic pattern of bit locations comprising n groups of q bit locations (where n and q are integers) regularly distributed over the duration of a frame;

phase shifting means responsive to a phase shifting instruction for selectively shifting the phase of said clock signal by an amount equal to at least one period of said recovered timing;

means for generating first and second versions of said clock signal phase shifted relative to one another by an amount equal to the phase shift by said phase shifting means;

a shift register formed of first and second parallel parts with serial inputs and parallel outputs which are clocked by said first and second versions of said clock signal and which receive in parallel said data bit stream, the first part being clocked by said first versions of said clock signal and having n·q) stages with presetting inputs and a presetting control input controlled by phase shifting control means; the second part being clocked by said second version of the clock signal, said second part of said shift register having at least (n·q−1) stages and having its parallel outputs connected to the presetting inputs of the stages of the first part of immediately higher rank, the presetting input of the first stage of the first part being connected in parallel with the serial inputs of the first and second parts;

a parallel input alignment word decoder connected to the outputs of the first part of the shift register which correspond within a pattern to the locations of the bits of an alignment word; and phase shifting control means delivering said phase shifting instructions to said phase shifting means and a parallel loading instruction to said presetting control input of said first part of the shift register when said decoder has not recognized the alignment word in the data bits within said shift register during a minimum period of two consecutive alignment word durations.

5. A frame synchronization device in a binary data transmission system in which the data is transmitted in the form of an isochronous bit stream organized into frames each provided with an alignment word with bits distributed within the frame, said device comprising:

timing means for obtaining a recovered timing from the data bit stream and for generating a clock signal from said recovered timing by selecting periods of said recovered timing signal which correspond to a periodic pattern of bit locations over the duration of a frame with at least some of said bit locations corresponding to the bits of the alignment word within a frame, said periodic pattern of bit locations comprising n groups of q bit locations (where n and q are integers) regularly distributed over the duration of a frame;

phase shifting means responsive to a phase shifting instruction for selectively shifting the phase of said clock signal by an amount equal to at least one period of said recovered timing;

means for generating first version of said clock signal, a second version phase shifted relative to said first version by an amount equal to the phase shift by said phase shifting means, and a third version phase shifted by said amount relative to said second version and by twice said amount relative to said first version;

a parallel alignment word decoder;

a prediction circuit comprising a parallel input prediction decoder for identifying a version of the alignment word having been subjected to a rotation corresponding to p groups of relative locations of bits of the pattern where p is an integer between 1 and n−1;

a shift register formed of first, second and third parallel parts with serial inputs and parallel outputs which are clocked by said first, second and third versions of said clock signal and which receive in parallel said data bit stream, the first part being clocked by said first version of said clock signal and having (n·q) stages with parallel presetting inputs for all stages and having a presetting control input controlled by phase shifting control means, the parallel outputs of the first part of said shift register being connected to the parallel inputs of said word decoder and said prediction circuit; the second part of said shift register being clocked by said second version of the clock signal, said second part of said shift register having at least (n·q−1) stages and having its parallel outputs connected to the presetting inputs of the stages of the first part of immediately higher rank, the first (r·q) stages of said second part of said shift register, where r is the larger of the numbers p and n−p, having parallel presetting inputs and said second part of said shift register having a partial presetting control input controlled by said phase shifting control means; and said third part of said shift register being clocked by said third version of said clock signal and having a number of register stages which is one less than the number (r·q) of parallel presetting inputs of the second part of said shift register and having its paralle outputs connected to the parallel presetting inputs of immediately higher rank of the second part; and said phase shifting conrol means delivering said phase shifting instruction to said phase shifting means and a presetting instruction to said first and second parts of said shift register when neither said word decoder nor said prediction circuit has recognized an alignment word or a permutated version of the alignment word in the data bits within the first part of said shift register during a minimum period corresponding to the passage of r groups of bit locations of a pattern.

* * * * *